United States Patent
Han et al.

(10) Patent No.: US 8,568,500 B2
(45) Date of Patent: *Oct. 29, 2013

(54) MULTI-CYCLONE DUST SEPARATOR AND A VACUUM CLEANER USING THE SAME

(75) Inventors: Jung-gyun Han, Busan (KR); Jang-keun Oh, Gwangju (KR); Min-ha Kim, Gwangju (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1040 days.

This patent is subject to a terminal disclaimer.

(21) Appl. No.: 12/222,795

(22) Filed: Aug. 15, 2008

(65) Prior Publication Data

US 2009/0019821 A1    Jan. 22, 2009

Related U.S. Application Data

(63) Continuation of application No. 11/242,382, filed on Oct. 3, 2005, now Pat. No. 7,470,299.

(60) Provisional application No. 60/666,095, filed on Mar. 29, 2005.

(30) Foreign Application Priority Data

May 4, 2005  (KR) .................................. 2005-37402

(51) Int. Cl.
    *B01D 45/12*   (2006.01)
(52) U.S. Cl.
    USPC ........... 55/345; 55/459.1; 55/DIG. 3; 15/350; 15/353
(58) Field of Classification Search
    USPC ........ 55/322, 325, 337, 345, 346, 349, 459.1, 55/DIG. 3; 15/350, 353
    See application file for complete search history.

(56) References Cited

U.S. PATENT DOCUMENTS

| | | | |
|---|---|---|---|
| 3,425,192 A | 2/1969 | Norman E. Davis | 55/345 |
| 4,373,228 A | 2/1983 | Dyson | |
| 5,129,124 A | 7/1992 | Gamou et al. | 15/352 |
| 6,238,451 B1 | 5/2001 | Conrad et al. | 55/323 |
| 2003/0057151 A1 | 3/2003 | Kopec et al. | 210/512.2 |
| 2004/0068827 A1 | 4/2004 | Dyson | |

FOREIGN PATENT DOCUMENTS

| | | |
|---|---|---|
| CN | 1593323 | 3/2005 |
| EP | 0728435 | 8/1996 |
| EP | 1563909 | 8/2005 |
| GB | 555558 | 7/1941 |

(Continued)

OTHER PUBLICATIONS

U.S. Appl. No. 11/318,177, filed Dec. 23, 2005, Jung-gyun Han et al., Samsung Gwangju Electronics Co., Ltd.

(Continued)

*Primary Examiner* — Robert A Hopkins
(74) *Attorney, Agent, or Firm* — Staas & Halsey LLP

(57) ABSTRACT

A multi-cyclone dust separator according to an embodiment of the present invention comprises at least three dust separation units for separating dust stepwise from relatively larger size. The dust separation units comprise a first dust separation unit primarily separating dust from external air drawn in; a second dust separation unit secondarily separating dust from the air primarily dust-separated by the first dust separation unit; and a third dust separation unit thirdly separating dust from the air secondarily dust-separated by the second dust separation unit. Here, the first to third dust separation units are multi-layered in a serial manner.

44 Claims, 3 Drawing Sheets

(56) References Cited

FOREIGN PATENT DOCUMENTS

| GB | 2101504 | 11/1981 |
|---|---|---|
| GB | 2113575 | 1/1983 |
| GB | 2410913 | 1/2000 |
| GB | 2367019 | 7/2000 |
| GB | 2372468 | 8/2002 |
| GB | 2406064 | 3/2005 |
| GB | 2410911 | 8/2005 |
| JP | 52-014775 | 2/1977 |
| JP | 2002-326041 | 11/2002 |
| KR | 10-2002-0071622 | 9/2002 |
| KR | 10-2002-0071624 | 9/2002 |
| KR | 1020040100720 | 12/2004 |
| KR | 1020020078798 | 10/2005 |
| WO | 03/030702 | 4/2003 |

OTHER PUBLICATIONS

UK High Court of Justice, Chancery Division, Patents Court (HC07C02383) "Amended Particulars of Claim", May 6, 2008.
UK High Court of Justice, Chancery Division, Patents Court (HC07C02383) "Re-amended Grounds of Invalidity", Jan. 23, 2008.
UK High Court of Justice, Chancery Division, Patents Court (HC07C02383) "Re-amended Defence", re-re-served Jun. 6, 2008.
UK High Court of Justice, Chancery Division, Patents Court (HC07C02383) "Request for Further Information of the Amended Grounds of Invalidity", served Jan. 30, 2008.
UK High Court of Justice, Chancery Division, Patents Court (HC07C02383) "Claimant's Response to Defendant's Request for Further Information", Feb. 13, 2008.
UK High Court of Justice, Chancery Division, Patents Court (HC07C02383) "Witness Statement of Min Ha Kim", Mar. 13, 2008.
UK Patent GB 2424603B, Feb. 21, 2007.
UK Patent GB 2424606A, Oct. 4, 2006.
UK Patent GB 2424606B, Mar. 14, 2007.
DC14 Dyson Brochure, Feb. 2005.
Dyson DC07 Owner's Manual Illustration.
Dyson DC08 Owner's Manual Illustration.
Claim Form dated Sep. 10, 2007 Corresponding to United Kingdom patent No. GB2424603.
Official Action dated May 18, 2007 from the corresponding Chinese Patent Application No. 200510117362.X.
Official Action dated Feb. 27, 2006 isued from the Korean Intellectual Property office with respect to Korean Patent Application No. 2005-37402 filed on May 4, 2005.
British Combined Search and Examination Report dated Mar. 27, 2006 with respect to corresponding British Patent Application No. 0521379.8 filed on Oct. 20, 2005.

MULTI-CYCLONE DUST SEPARATOR AND A VACUUM CLEANER USING THE SAME

CROSS-REFERENCE TO RELATED APPLICATIONS

This application is a Continuation Application of U.S. Ser. No. 11/242,382 filed on Oct. 3, 2005, now U.S. Pat. No. 7,470,299, and claims the benefit of U.S. Provisional Application No. 60/666,095, filed on Mar. 29, 2005 in the United States Patent and Trademark Office, and the benefit of Korean Patent Application No. 2005-37402 filed on May 4, 2005 in the Korean Intellectual Property Office, the entire disclosures of which are incorporated herein by reference.

BACKGROUND

1. Field

The present invention relates to a multi-cyclone dust separator and a vacuum cleaner using the same. More particularly, the present invention relates to a multi-cyclone dust separator comprising a plurality of cyclones to separate dust stepwise according to size, and a vacuum cleaner using the same.

2. Description of the Related Art

Generally, a cyclone dust separator generates a whirling air current in a cyclone chamber and separates dust and dirt from external air using a centrifugal force of the whirling air current. An example of a vacuum cleaner applying such a cyclone dust separator is disclosed in U.S. Pat. No. 3,425,192.

In the disclosed vacuum cleaner, a first cyclone separator is mounted at a lower part of a housing, whereas a second cyclone separator is mounted at an upper part of the first cyclone separator. According to this structure, relatively large dust included in drawn-in air is primarily separated. The primarily cleaned air is drawn into the second cyclone separator so that relatively fine dust is separated in the second cyclone separator.

However, in such a two-step cyclone separator according to the conventional art, suction efficiency is imperfect.

SUMMARY

An aspect of the present invention is to solve at least the above problems and/or disadvantages and to provide at least the advantages described below. Accordingly, an aspect of the present invention is to provide a multi-cyclone dust separator capable of improving suction efficiency by providing a plurality of cyclone separators for separating dust stepwise according to size, and a vacuum cleaner using the same.

In order to achieve the above-described aspects of the present invention, there is provided a multi-cyclone dust separator having at least three dust separation units for separating dust stepwise according to size of the dust.

The dust separation units comprise a first dust separation unit primarily separating dust from external air drawn in; a second dust separation unit secondarily separating dust from the air primarily dust-separated by the first dust separation unit; and a third dust separation unit thirdly separating dust from the air secondarily dust-separated by the second dust separation unit.

The first to third dust separation units are arranged in a serial manner. Preferably, the plurality of dust separation units are multi-layered.

According to another aspect of the present invention, there is provided a vacuum cleaner applying the multi-cyclone dust separator, which comprises a cleaner body; a suction brush fluidly communicated with the cleaner body to draw in dust-laden air from a surface being cleaned; and a multi-cyclone dust separator mounted in the cleaner body to separate dust from air drawn in through the suction brush and comprising at least three dust separation units for separating the dust stepwise from relatively larger dust to smaller dust.

By using the above multi-cyclone dust separator, dust can be sequentially separated according to sizes thereof, thereby enhancing the suction efficiency.

In addition, by applying the multi-cyclone dust separator to a vacuum cleaner, cleaning efficiency can be improved.

BRIEF DESCRIPTION OF THE DRAWINGS

The above aspect and other features of the present invention will become more apparent by describing in detail exemplary embodiments thereof with reference to the attached drawing figures, wherein.

DETAILED DESCRIPTION OF THE EMBODIMENTS

Figure 1:
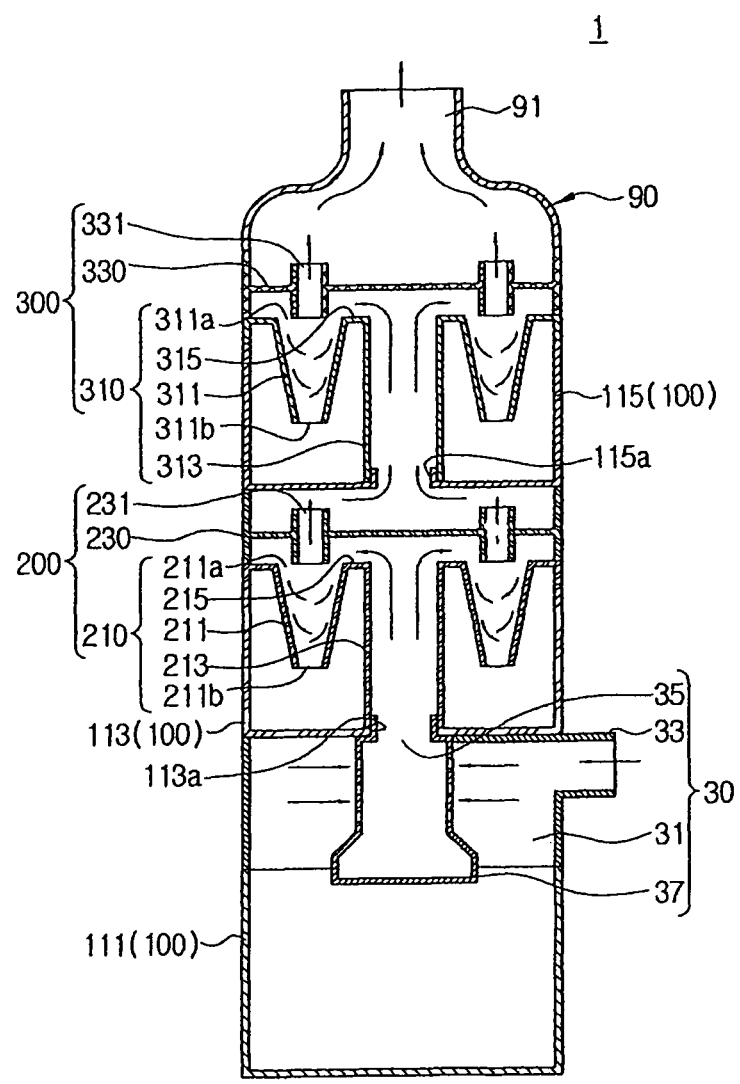
FIG. 1 is a sectional view schematically showing the structure of a multi-cyclone dust separator according to an embodiment of the present invention.

Hereinafter, certain embodiments of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 schematically shows the structure of a multi-cyclone dust separator according to an embodiment of the present invention.

Referring to FIG. 1, a multi-cyclone dust separator 1 mainly comprises first to third dust separation units 30, 200 and 300, a top cover 90, and a dust collection unit 100. The dust collection unit 100 comprises first to third dust receptacles 111, 113 and 115.

The first dust separation unit 30 primarily separates relatively large dust included in external air drawn in. For this purpose, the first dust separation unit 30 comprises a first chamber 31 having a first air inlet 33 and a first air outlet 35, and a grill member 37. The grill member 37 is mounted at the lower stream of the first air outlet 35 to prevent the dust separated from the external air from flowing back through the first air outlet 35. The first chamber 31 is connected by a lower part thereof to the first dust receptacle 111 which collects therein the dust separated through the first chamber 31.

The second dust separation unit 200 separates dust of a relatively medium size included in the air which has been primarily cleaned through the first dust separation unit 30. The second dust separation unit 200 comprises a second cyclone body 210 and a second cyclone cover 230.

The second cyclone body 210 comprises a plurality of second chambers 211 each having a second air inlet 211*a* for drawing in the air, an intermediate air outlet 211*b* for exhausting the separated dust, an intermediate path formation member 213 fluidly communicated with the first air outlet 35 of the first dust separation unit 30, and an intermediate connection path 215 connecting the respective second chambers 211 with the intermediate path formation member 213.

The second cyclone cover 230 shields a top of the second cyclone body 210 and has a second air outlet 231 for exhausting the air ascending after being secondarily cleaned through the second chamber 211.

The second cyclone body 210 has at a lower part thereof second dust receptacle 113 as the dust collection unit 100. Second dust receptacle 113 collects therein the medium dust separated by the second chambers 211. The second dust receptacle 113 has a penetration hole 113*a* connected to the intermediate path formation member 213.

The third dust separation unit 300 separates relatively fine dust still remaining in the air secondarily cleaned through the second dust separation unit 200. For this, the third dust separation unit 300 comprises a third cyclone body 310 and a third cyclone cover 330.

The third cyclone body 310 comprises a plurality of third chambers 311 each having a third air inlet 311*a* for drawing in the air, an upper dust outlet 311*b* for exhausting the separated dust, an upper path formation member 313 guiding the air exhausted from the second air outlet 231 of the second cyclone cover 230, and an upper connection path 315 connecting the upper path formation member 313 with the third chambers 311.

The third cyclone cover 330 shields a top of the third cyclone body 310 and has a third air outlet 331 for exhausting the air ascending after being thirdly cleaned by the third chamber 311.

The third cyclone body 310 has at a lower part thereof third dust receptacle 115 as the dust collection unit 100. Third dust receptacle 115 collects therein the relatively fine dust separated by the third chambers 311. The third dust receptacle 115 has a communication hole 115*a* connected to the intermediate path formation member 213.

The top cover 90 is connected to a top of the third cyclone cover 330 and has an opening 91 exhausting the cleaned air at an upper part thereof.

The first to third dust separation units 30, 200 and 300 are preferably arranged in a serially layered manner. However, the present invention is not limited to this structure but may apply various arrangements of the dust separation units 30, 200 and 300.

Also, although the dust collection unit 100 comprises the first to third dust receptacles 111, 113 and 115 in this embodiment, only the first receptacle 111 may be provided so that the dust separated and exhausted by the second and the third dust separation unit 200 and 300 may be finally collected into only the first receptacle 111.

Figure 2:
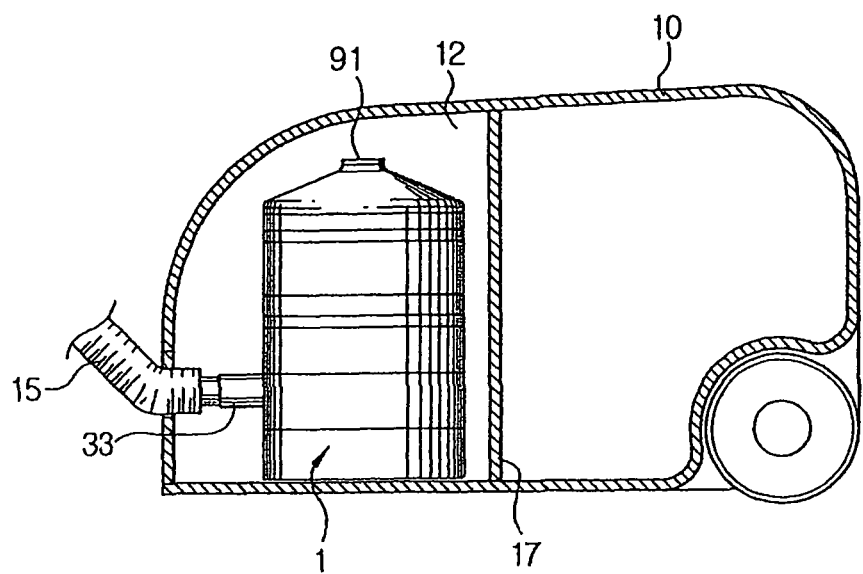
FIG. 2 is a view showing the structure of a canister-type vacuum cleaner applying the multi-cyclone dust separator of FIG. 1.

FIG. 2 shows a canister-type vacuum cleaner applying the multi-cyclone dust separator according to an embodiment of the present invention.

Referring to FIG. 2, a cleaner body 10 of the vacuum cleaner includes at one side a dust collecting chamber 12 defined by a partition 17. The dust collecting chamber 12 has therein the multi-cyclone dust separator 1. The first air inlet 33 of the multi-cyclone dust separator 1 is connected to a flexible hose 15 of the vacuum cleaner.

Figure 3:
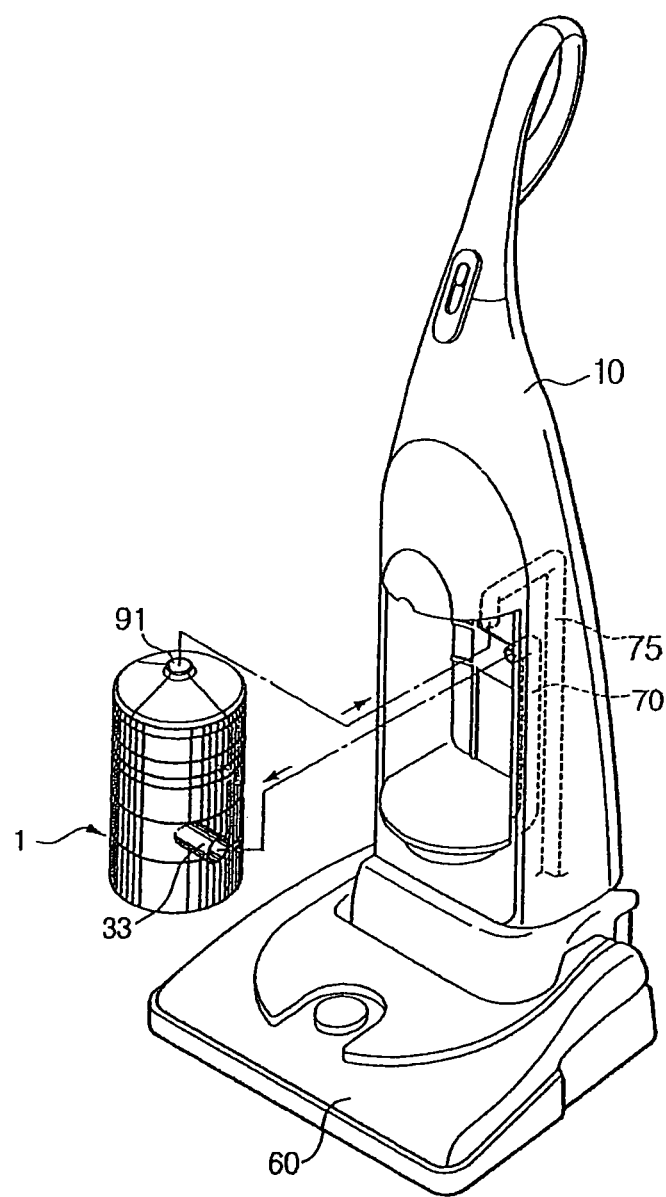
FIG. 3 is a view showing the structure of an upright-type vacuum cleaner applying the multi-cyclone dust separator of FIG. 1.

FIG. 3 shows an upright-type vacuum cleaner applying the multi-cyclone dust separator according to an embodiment of the present invention.

Referring to FIG. 3, a cleaner body 10' includes an air suction path 70 connected to a suction brush 60 and an air discharge path 75 connected to a motor driver (not shown).

The air inlet 33 of the multi-cyclone dust separator 1 is fluidly communicated with the air suction path 70, whereas the opening 91 of the top cover 90 is fluidly communicated with the air discharge path 75. Therefore, as the external air drawn in through the suction brush 60 passes through the multi-cyclone dust separator 1, the dust is separated and the cleaned air is discharged to the outside, passing through the opening 91 and the air discharge path 75.

Hereinbelow, the operations of the above multi-cyclone dust separator and the upright-type vacuum cleaner applying the same will be described in greater detail.

Referring to FIG. 3, a driving part (not shown) generates a suction force to draw in dust-laden air through the suction brush 60.

Referring to FIG. 1, the drawn-in air is induced to the first chamber 31 of the first dust separation unit 30 through the first air inlet 33 of the multi-cyclone dust separator 1. The induced air is centrifuged in the first chamber 31 and consequently, the relatively large dust is collected in the first dust receptacle 111.

The principle of separating the dust will briefly be explained. The external air is tangentially drawn in along an inner wall of the first chamber 31. As rotating along the inner wall of the first chamber 31, the drawn-in air generates a centrifugal force. Since the air, which is relatively light, is less influenced by the centrifugal force, the air is gathered to the center of the first chamber 31, thereby generating a whirling current, and discharged toward the first air outlet 35.

On the other hand, the dust, relatively heavier than the air, is much influenced by the centrifugal force. Therefore, the dust flows along the inner wall of the first chamber 31 and is collected in the first dust receptacle 111.

The air, from which the relatively large dust is separated by the first dust separation unit 30, passes through the first air outlet 35 of the first chamber 31 and ascends along the intermediate path formation member 213. Then, the air is drawn into the second chamber 211 in a tangential direction through the intermediate connection path 215.

Because the air ascending along the intermediate path formation member 213 is radially diverged through the intermediate connection path 215, volume of the air current is reduced. Accordingly, separation of the dust in the second dust separation unit 200 can be more easily achieved.

The air induced into the second chamber 211 is centrifuged secondarily so that the medium-size dust is separated and collected in the second dust receptacle 113.

The air secondarily cleaned by the second dust separation unit 200 is discharged through the second air outlet 231 of the second cyclone cover 230.

The discharged air is induced to the third chamber 311 of the third dust separation unit 300 through the upper path formation member 313 and then centrifuged in the same manner as in the second dust separation unit 200.

The air cleaned through the third chamber 311 is discharged through the third air outlet 331 of the third cyclone cover 330, gathered in the top cover 90 and then discharged to the outside through the opening 90.

As described above, by separating the dust included in the external air stepwise according to the size thereof, the dust separation efficiency can be enhanced.

While the invention has been shown and described with reference to certain embodiments thereof, it will be understood by those skilled in the art that various changes in form and details may be made therein without departing from the spirit and scope of the invention as defined by the appended claims.

What is claimed is:

1. A vacuum cleaner comprising:
   a cleaner body;
   a nozzle unit in fluid communication with the cleaner body to draw in dust-laden air from a surface to be cleaned; and
   a multi-cyclone dust separator mounted in the cleaner body to separate dust from the dust-laden air drawn in through the nozzle unit, the multi-cyclone dust separator comprising at least three dust separation units, including a first dust separation unit, a second dust separation unit, and a third dust separation unit sequentially separating dust particles and centrifugally separating the dust particles in at least three steps according to respective sizes,
   wherein the second dust separation unit has a plurality of second cyclone chambers, and air discharged from the plurality of second cyclone chambers are combined and flow into the third dust separation unit.

2. The vacuum cleaner of claim 1, wherein the second dust separation unit comprises an intermediate path formation member to guide air discharged from the first dust separation unit toward the second cyclone chambers.

3. The vacuum cleaner of claim 2, wherein the second dust separation unit further comprises at least one intermediate connection path connecting a respective second cyclone chamber with the intermediate path formation member.

4. The vacuum cleaner of claim 1, wherein the third dust separation unit further comprises an upper connection path connecting at least one third cyclone chamber of the third dust separation unit with air from the second dust separation unit.

5. The vacuum cleaner of claim 4, wherein the third dust separation unit comprises a plurality of third cyclone chambers, and the upper connection path guides the air from the second dust separation unit.

6. The vacuum cleaner of claim 4, wherein the third dust separation unit further comprises a third cover having an air outlet discharging air having passed through the at least one third cyclone chamber.

7. The vacuum cleaner of claim 1, wherein the multi-cyclone dust separator further comprises a top cover collecting air discharged from the third dust separation unit.

8. The vacuum cleaner of claim 7, further comprises a suction motor installed downstream of the top cover.

9. A vacuum cleaner comprising:
   a cleaner body;
   a nozzle unit in fluid communication with the cleaner body to draw in dust-carrying air from a surface to be cleaned; and
   a multi-cyclone dust separator mounted in the cleaner body to separate dust from the dust-carrying air drawn in through the nozzle unit, the multi-cyclone dust separator comprising at least three cyclonic dust separation units, including a first cyclonic dust separation unit, a second cyclonic dust separation unit and a third cyclonic dust separation unit sequentially separating dust particles and centrifugally separating the dust particles in at least three respective steps according to respective sizes,
   wherein at least one of the second cyclonic dust separation unit and the third cyclonic dust separation units includes a plurality of cyclone chambers, with all air discharged from the second cyclonic dust separation unit being induced into the third cyclonic dust separation unit.

10. The vacuum cleaner of claim 9, wherein the plurality of cyclone chambers of the third dust separation unit are disposed to be vertically aligned within a circumference of the first dust separation unit.

11. The vacuum cleaner of claim 9, wherein the first cyclonic dust separation unit includes a first air inlet, a first cyclone chamber, and a first air outlet, and the second cyclonic dust separation unit includes at least one second air inlet, at least one second cyclone chamber, and at least one second air outlet.

12. The vacuum cleaner of claim 9, wherein a diameter of a first cyclone chamber of the first cyclonic dust separation unit is greater than a diameter of a cyclone chamber of the third cyclonic dust separation unit.

13. The vacuum cleaner of claim 9, wherein the second cyclonic dust separation unit has a plurality of second cyclone chambers and the third cyclonic dust separation unit has a plurality of third cyclone chambers.

14. The vacuum cleaner of claim 9, wherein the first, the second, and the third cyclonic dust separation units do not overlap each other.

15. The vacuum cleaner of claim 9, wherein the multi-cyclone dust separator further comprises a grill in the first cyclonic dust separation unit to prevent large dust particles from passing from the first cyclonic dust separation unit to the second cyclonic dust separation unit.

16. A vacuum cleaner comprising:
   a cleaner body;
   a nozzle unit in fluid communication with the cleaner body to draw in dust-carrying air from a surface to be cleaned; and
   a multi-cyclone dust separator mounted in the cleaner body to separate dust from the dust-carrying air drawn in through the nozzle unit, the multi-cyclone dust separator comprising at least three dust separation units, including a first dust separation unit, a second dust separation unit, and a third dust separation unit sequentially separating dust particles and centrifugally separating the dust particles in at least three respective steps according to respective sizes,
   wherein the multi-cyclone dust separator further comprises a grill in the first dust separation unit.

17. The vacuum cleaner of claim 16, wherein the first dust separation unit has a first air inlet, a first cyclone chamber, and a first air outlet, and the grille is installed upstream of the first air outlet.

18. A vacuum cleaner comprising:
   a cleaner body;
   a nozzle unit in fluid communication with the cleaner body to draw in dust-carrying air from a surface to be cleaned; and
   a multi-cyclone dust separator mounted in the cleaner body to separate dust from the dust-carrying air drawn in through the nozzle unit, the multi-cyclone dust separator comprising at least three dust separation units, including a first dust separation unit, a second dust separation unit, and a third dust separation unit sequentially separating dust particles and centrifugally separating the dust particles in at least three respective steps according to respective sizes,
   wherein the second dust separation unit is located above the first dust separation unit, and the third dust separation unit is located above the second dust separation unit.

19. The vacuum cleaner of claim 18, wherein at least one of the second dust separation unit and the third dust separation units includes a plurality of cyclone chambers.

20. The vacuum cleaner of claim 19, wherein all air discharged from the second dust separation unit is induced into the third dust separation unit.

21. The vacuum cleaner of claim 18, wherein all air discharged from the second dust separation unit is induced into the third dust separation unit.

22. The vacuum cleaner of claim 18, wherein the first dust separation unit, the second dust separation unit, and the third dust separation unit are separated in a vertical direction.

23. A vacuum cleaner comprising:
a cleaner body;
a nozzle unit in fluid communication with the cleaner body to draw in dust-carrying air from a surface to be cleaned; and
a multi-cyclone dust separator mounted in the cleaner body to separate dust from the dust-carrying air drawn in through the nozzle unit, the multi-cyclone dust separator comprising at least three dust separation units, including a first dust separation unit, a second dust separation unit, and a third dust separation unit sequentially separating dust particles and separating the dust particles in at least three respective steps according to respective sizes,
wherein the second dust separation unit is located above the first dust separation unit, and the third dust separation unit is located above the second dust separation unit,
wherein the multi-cyclone dust separator has a first dust receptacle, a second dust receptacle, and a third dust receptacle.

24. The vacuum cleaner of claim 18, wherein the multi-cyclone dust separator has a common dust receptacle for all dust separation units.

25. The vacuum cleaner of claim 18, wherein the first, the second, and the third dust separation unit are arranged in a serial manner.

26. The vacuum cleaner of claim 18, wherein the first, the second, and the third dust separation unit are arranged adjacent to another.

27. The vacuum cleaner of claim 23, wherein the second dust receptacle is located above the first dust receptacle, and the third dust receptacle is located above the second dust receptacle.

28. A vacuum cleaner comprising:
a cleaner body;
a nozzle unit in fluid communication with the cleaner body to draw in dust-carrying air from a surface to be cleaned; and
a multi-cyclone dust separator mounted in the cleaner body to separate dust from the dust-carrying air drawn in through the nozzle unit, the multi-cyclone dust separator comprising at least three dust separation units, including a first dust separation unit, a second dust separation unit, and a third dust separation unit sequentially separating dust particles and centrifugally separating the dust particles in at least three respective steps according to respective sizes,
wherein the multi-cyclone dust separator includes a top cover collecting air discharged from the third dust separation unit, with the top cover having an opening and narrows in a discharge direction.

29. The vacuum cleaner of claim 28, wherein the top cover has a rounded shape.

30. The vacuum cleaner of claim 28, wherein the multi-cyclone dust separator further comprises a second cover having a second air outlet to discharge air having passed through the second dust separation unit.

31. A vacuum cleaner comprising:
a cleaner body;
a nozzle unit in fluid communication with the cleaner body to draw in dust-carrying air from a surface to be cleaned; and
a multi-cyclone dust separator mounted in the cleaner body to separate dust from the dust-carrying air drawn in through the nozzle unit, the multi-cyclone dust separator comprising at least three dust separation units, including a first dust separation unit, a second dust separation unit, and a third dust separation unit sequentially separating dust particles and separating the dust particles in at least three respective steps according to respective sizes,
wherein the multi-cyclone dust separator includes a top cover collecting air discharged from the third dust separation unit, with the top cover having an opening and narrows in a discharge direction,
wherein the multi-cyclone dust separator further comprises a third cover connected to the top cover, with the third cover having a third air outlet to discharge air having passed through the third dust separation unit.

32. A vacuum cleaner comprising:
a cleaner body;
a nozzle unit in fluid communication with the cleaner body to draw in dust-carrying air from a surface to be cleaned; and
a multi-cyclone dust separator mounted in the cleaner body to separate dust from the dust-carrying air drawn in through the nozzle unit, the multi-cyclone dust separator comprising at least three dust separation units, including a first dust separation unit, a second dust separation unit, and a third dust separation unit sequentially separating dust particles and centrifugally separating the dust particles in at least three respective steps according to respective sizes,
wherein at least one of the second dust separation unit and the third dust separation units has a plurality of cyclone chambers, with a suction motor being installed downstream of the third dust separation unit.

33. The vacuum cleaner of claim 32, wherein the multi-cyclone dust separator further comprises a grill in the first dust separation unit.

34. The vacuum cleaner of claim 32, wherein the first dust separation unit has a first air inlet, a first cyclone chamber, and a first air outlet, and the vacuum cleaner further comprises a grille installed upstream of the first air outlet.

35. A vacuum cleaner comprising:
a cleaner body;
a nozzle unit in fluid communication with the cleaner body to draw in dust-carrying air from a surface to be cleaned; and
a multi-cyclone dust separator mounted in the cleaner body to separate dust from the dust-carrying air drawn in through the nozzle unit, the multi-cyclone dust separator comprising at least three dust separation units, including a first dust separation unit, a second dust separation unit, and a third dust separation unit sequentially separating dust particles and centrifugally separating the dust particles in at least three respective steps according to respective sizes,
wherein at least one of the second dust separation unit and the third dust separation units has a plurality of cyclone chambers, and all dust-carrying air passes through the first, the second, and the third dust separation units.

36. The vacuum cleaner of claim 35, further comprising a suction motor disposed downstream of the third dust separation unit.

37. The vacuum cleaner of claim 36, further comprising a top cover disposed between the third dust separation unit and the suction motor.

38. The vacuum cleaner of claim 37, wherein at least one of the first, the second, and the third dust separation units are disposed above each other.

39. The vacuum cleaner of claim 37, wherein the vacuum cleaner is an upright type.

40. The vacuum cleaner of claim 37, wherein the vacuum cleaner is a canister type.

41. The vacuum cleaner of claim 37, further comprising a grill disposed between the first dust separation unit and the second dust separation unit to prevent large dust particles, separated by the first dust separation unit, from being passed onto the second dust separation unit.

42. The vacuum cleaner of claim 41, wherein the multi-cyclone dust separator has a common dust receptacle for all dust separation units.

43. A vacuum cleaner comprising:
a cleaner body;
a nozzle unit in fluid communication with the cleaner body to draw in dust-carrying air from a surface to be cleaned; and
a multi-cyclone dust separator mounted in the cleaner body to separate dust from the dust-carrying air drawn in through the nozzle unit, the multi-cyclone dust separator comprising at least three dust separation units, including a first dust separation unit, a second dust separation unit and a third dust separation unit sequentially separating dust particles and centrifugally separating the dust particles in at least three respective steps according to respective sizes,
wherein at least one of the second dust separation unit and the third dust separation units includes a plurality of cyclone chambers, with all air discharged from the second dust separation unit being induced into the third dust separation unit, and
wherein the first dust separation unit includes a first air inlet, a first chamber, and a first air outlet, and the second dust separation unit includes at least one second air inlet and at least one second air outlet.

44. A vacuum cleaner comprising:
a cleaner body;
a nozzle unit in fluid communication with the cleaner body to draw in dust-carrying air from a surface to be cleaned; and
a multi-cyclone dust separator mounted in the cleaner body to separate dust from the dust-carrying air drawn in through the nozzle unit, the multi-cyclone dust separator comprising at least three dust separation units, including a first dust separation unit, a second dust separation unit and a third dust separation unit sequentially separating dust particles and centrifugally separating the dust particles in at least three respective steps according to respective sizes,
wherein at least one of the second dust separation unit and the third dust separation units includes a plurality of cyclone chambers, with all air discharged from the second dust separation unit being induced into the third dust separation unit, and
wherein the first, the second, and the third dust separation units do not overlap each other.

* * * * *